(12) United States Patent
Cabasse et al.

(10) Patent No.: US 8,867,554 B2
(45) Date of Patent: Oct. 21, 2014

(54) METHODS TO ROUTE, TO ADDRESS AND TO RECEIVE A COMMUNICATION IN A CONTACT CENTER, CALLER ENDPOINT, COMMUNICATION SERVER, DOCUMENT SERVER FOR THESE METHODS

(75) Inventors: Gilbert Cabasse, Brest (FR); Frederic Thomas, Brest (FR)

(73) Assignee: Alcatel Lucent, Boulogne-Billancourt (FR)

(*) Notice: Subject to any disclaimer, the term of this patent is extended or adjusted under 35 U.S.C. 154(b) by 569 days.

(21) Appl. No.: 13/000,713

(22) PCT Filed: Jun. 1, 2009

(86) PCT No.: PCT/EP2009/056699
§ 371 (c)(1),
(2), (4) Date: Mar. 24, 2011

(87) PCT Pub. No.: WO2009/156245
PCT Pub. Date: Dec. 30, 2009

(65) Prior Publication Data
US 2011/0164610 A1 Jul. 7, 2011

(30) Foreign Application Priority Data
Jun. 26, 2008 (EP) .................................. 08290612

(51) Int. Cl.
H04L 12/28 (2006.01)
H04M 3/00 (2006.01)
H04M 3/51 (2006.01)
H04M 7/00 (2006.01)
H04M 3/523 (2006.01)

(52) U.S. Cl.
CPC ............ *H04M 7/003* (2013.01); *H04M 3/5191* (2013.01); *H04M 3/5231* (2013.01)

USPC .................. 370/401; 379/265.02; 379/265.09

(58) Field of Classification Search
CPC .. H04M 7/003; H04M 3/5231; H04M 3/5191
USPC ........................................ 379/265.02, 265.09
See application file for complete search history.

(56) References Cited

U.S. PATENT DOCUMENTS 6,012,090 A * 1/2000 Chung et al. .................. 709/219
6,134,318 A * 10/2000 O'Neil ....................... 379/266.01

(Continued)

FOREIGN PATENT DOCUMENTS

EP 0 829 996 A 3/1998

OTHER PUBLICATIONS

International Search Report for PCT/EP2009/056699 dated Aug. 5, 2009.

*Primary Examiner* — Gregory Sefcheck
(74) *Attorney, Agent, or Firm* — Fay Sharpe, LLP

(57) ABSTRACT

Click-to-dial function whereby the URL sent to the contact center is appended with additional information used within the contact center (ACD) for routing. Function is known under the terms such as: extended URL, URL Encoding, Percent-encoding and the query string (part of a URL that contains data to be passed to web applications such as CGI programs). The method to route a communication from a caller to a specific endpoint in a contact center comprises the routing (124) of the communication from an entry point of the contact center routing parameter contained in a hypertext link selected by a caller on his endpoint, this contact center routing parameter being irrelevant for routing the communication over Internet. Relates to use of RFC 3986 in call center environment.

2 Claims, 2 Drawing Sheets

(56) References Cited

U.S. PATENT DOCUMENTS

| | | | |
|---|---|---|---|
| 6,341,353 B1* | 1/2002 | Herman et al. | 726/5 |
| 6,378,075 B1* | 4/2002 | Goldstein et al. | 726/5 |
| 6,493,447 B1* | 12/2002 | Goss et al. | 379/265.09 |
| 6,615,238 B1* | 9/2003 | Melet et al. | 709/203 |
| 6,651,085 B1* | 11/2003 | Woods | 709/203 |
| 6,665,395 B1* | 12/2003 | Busey et al. | 379/265.09 |
| 6,741,699 B1* | 5/2004 | Flockhart et al. | 379/265.09 |
| 6,820,260 B1* | 11/2004 | Flockhart et al. | 717/173 |
| 6,868,395 B1* | 3/2005 | Szlam et al. | 705/26.82 |
| 6,889,195 B2* | 5/2005 | Strandberg | 705/7.11 |
| 6,993,591 B1* | 1/2006 | Klemm | 709/232 |
| 6,996,605 B2* | 2/2006 | Low et al. | 709/204 |
| 7,085,366 B2* | 8/2006 | O'Neil | 379/265.01 |
| 7,092,509 B1* | 8/2006 | Mears et al. | 379/266.01 |
| 7,117,227 B2* | 10/2006 | Call | 709/219 |
| 7,149,287 B1* | 12/2006 | Burger et al. | 379/88.17 |
| 7,165,722 B2* | 1/2007 | Shafer et al. | 235/385 |
| 7,181,492 B2* | 2/2007 | Wen et al. | 709/204 |
| 7,346,618 B2* | 3/2008 | Himeno | 1/1 |
| 7,372,957 B2* | 5/2008 | Strathmeyer et al. | 379/265.01 |
| 7,382,773 B2* | 6/2008 | Schoeneberger et al. | 370/353 |
| 7,451,389 B2* | 11/2008 | Huynh et al. | 715/230 |
| 7,466,689 B1* | 12/2008 | Halpern et al. | 370/352 |
| 7,499,972 B1* | 3/2009 | Buonanno et al. | 709/204 |
| 7,516,194 B1* | 4/2009 | Lamkins et al. | 709/218 |
| 7,522,720 B2* | 4/2009 | Drobek | 379/265.02 |
| 7,693,827 B2* | 4/2010 | Zamir et al. | 707/999.003 |
| 7,698,442 B1* | 4/2010 | Krishnamurthy et al. | 709/229 |
| 7,702,093 B2* | 4/2010 | Marquette et al. | 379/265.02 |
| 7,702,731 B2* | 4/2010 | Lingafelt et al. | 709/205 |
| 7,738,861 B2* | 6/2010 | Fournier | 455/415 |
| 7,769,648 B1* | 8/2010 | Nolan | 705/32 |
| 7,783,622 B1* | 8/2010 | Vandermolen et al. | 707/708 |
| 7,849,018 B1* | 12/2010 | Warner | 705/59 |
| 7,949,121 B1* | 5/2011 | Flockhart et al. | 379/265.02 |
| 8,019,488 B2* | 9/2011 | Taki et al. | 701/2 |
| 8,028,084 B2* | 9/2011 | Hollatz | 709/238 |
| 8,032,427 B1* | 10/2011 | Spreen et al. | 705/26.9 |
| 8,045,697 B1* | 10/2011 | Martin | 379/265.12 |
| 8,065,520 B2* | 11/2011 | Hsu et al. | 713/162 |
| 8,090,793 B2* | 1/2012 | Muir et al. | 709/217 |
| 8,266,534 B2* | 9/2012 | Curtis et al. | 715/753 |
| 8,429,422 B1* | 4/2013 | Hagan et al. | 713/190 |
| 2002/0152258 A1* | 10/2002 | Zhou | 709/201 |
| 2004/0034707 A1* | 2/2004 | Royer | 709/227 |
| 2004/0221034 A1* | 11/2004 | Kausik et al. | 709/224 |
| 2005/0190053 A1* | 9/2005 | Dione | 340/500 |
| 2006/0262922 A1* | 11/2006 | Margulies et al. | 379/265.12 |
| 2007/0204062 A1* | 8/2007 | Gillis et al. | 709/238 |
| 2009/0285385 A1* | 11/2009 | Dunbar et al. | 379/266.01 |
| 2011/0093771 A1* | 4/2011 | Gordon | 715/230 |
| 2011/0164610 A1* | 7/2011 | Cabasse et al. | 370/352 |
| 2011/0216897 A1* | 9/2011 | Laredo et al. | 379/265.13 |
| 2011/0246260 A1* | 10/2011 | Gilbert et al. | 705/7.32 |
| 2012/0096366 A1* | 4/2012 | Narla et al. | 715/744 |

* cited by examiner

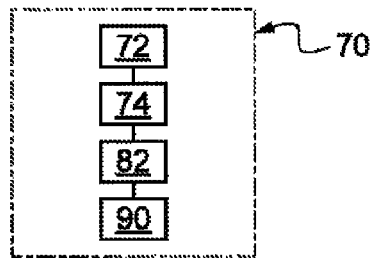
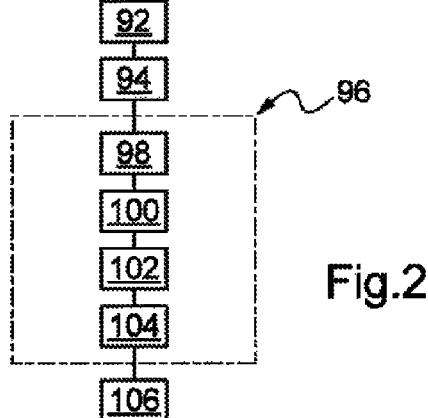
Fig.2
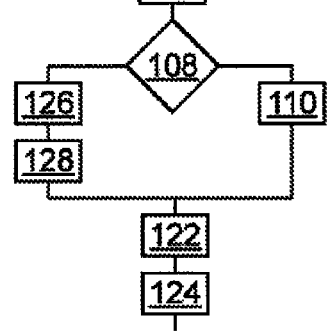
Fig.3
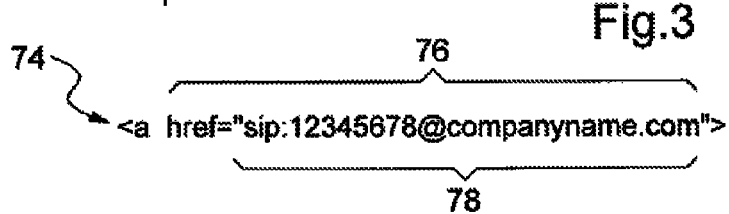
Fig.4
Fig.5

METHODS TO ROUTE, TO ADDRESS AND TO RECEIVE A COMMUNICATION IN A CONTACT CENTER, CALLER ENDPOINT, COMMUNICATION SERVER, DOCUMENT SERVER FOR THESE METHODS

FIELD OF THE INVENTION

The present invention relates to a method to route a communication from a caller to a specific endpoint in a contact center. The invention also relates to:
- a method to address a communication to a contact center over Internet,
- a method to receive a communication over Internet in a contact center,
- a caller endpoint,
- a communication server of a contact center, and
- a document server.

BACKGROUND OF THE INVENTION

Internet is a packet switched data network. Internet is also known as "World Wide Web".

A contact center is a place where are located many agents to received and to answer communications from callers. Each agent is equipped with an endpoint to receive and answer the communication. An endpoint is the name for the entity on one end of a transport layer connection. Here the endpoint is embodied as a telecommunication endpoint like a phone handset, a mailer application or a chat application or any other kind of telecommunication endpoints that form a user-machine interface to communicate through Internet with a contact center agent. When the endpoint is a phone handset, the contact center is known as "call center". The caller is also equipped with an endpoint to transmit and receive information through Internet.

A communication can be addressed to the contact center through the use of the contact center URL (Uniform Resource Locator). The contact center has only one URL or a number of URLs than can answer to a communication. This or these URLs are used to route communications to an "entry point" of the contact center. Each time a communication is addressed to the contact center, this communication has to be routed from the entry point to the adequate agent's endpoint within the contact center.

"Communication over Internet" encompasses any exchange or transfer of information through Internet between an agent, within a contact center, and a caller. For example, a communication over Internet may be a phone call or a video conference between an agent and a caller endpoints linked to each other through Internet. In this last case, the communication over Internet is also known as voice over IP (Internet Protocol) or "VoIP". The communication over Internet may also be a transfer of emails between the agent and the caller or a chat over Internet.

A URL (Uniform Resource Locator) must be used to address a communication to a desired endpoint over Internet. The URL contains a contact center network address that allows to route the communication to the desired entry point of the contact center through Internet. The contact center network address is an IP address or any information that can be converted into an IP address such as a domain name. Typically, the URL starts with a scheme name and is followed by a hostname. For example, the scheme name is "mailto:" or "sip:". The hostname may be a combination of a host's local name with its parent domain's name. For example, the URL has the following format when SIP (Session Initiation Protocol) is used to communicate over Internet:

Sip: xxx@yyy.zzz where:
- xxx is a user name,
- yyy.zzz is a hostname, and
- zzz is an extension.

"xxx" et "yyy" are character strings. "zzz" is a predetermined extension like ".com", ".fr", ".eu", ".gov" and so on. This format is very similar to the one of email address.

The hostname is a network address.

A contact center is equipped to handle a large volume of communications, especially for taking orders or servicing customers. Conventionally, a contact center has many contact center agents, each agent being provided with an endpoint to receive or answer communication. Contact center agents can be grouped according to their competence or skills.

The applicant knows a method to route a communication from a caller from an entry point of the contact center to a specific endpoint in a contact center. The method comprises:
- displaying a hypertext link on a caller endpoint, the hypertext link containing a contact center URL (Uniform Resource Locator) to route a communication to the contact center over Internet,
- upon selection of the hypertext link by a caller, addressing a communication to the contact center using the contact center URL contained in the hypertext link,
- upon reception of this communication at the contact center, routing the communication from the entry point to the specific endpoint among a plurality of different endpoints of the contact center able to receive this communication.

When such a hypertext links triggers a call when selected, it is also known as "Clik-to-Call" hypertext link.

In this context, it is desirable to route the call to a specific endpoint of an agent competent to answer the particular needs of the caller. Several methods have been proposed to meet this desire in the context of call centers.

In a first proposed method, the need of the caller is deduced from the composed phone number. Thus, the call center has to be configured with several different phone numbers. At each phone number is associated a specific agent skill. This method suffer of the drawback that many phone numbers are used. In addition, the management of such a call center may become complex if an agent has several skills.

A second method consists in directly writing the phone number of the suitable agent in the hypertext link. This supposes that each agent has a direct phone number. Many direct phone numbers are not always available. Furthermore, it is then necessary to implement specific procedure to handle situations like a busy or absent agent.

A third method is to identify the needs of a caller from the calling phone number. For example, a server searches in a database, the needs associated with the calling phone number and then routes the call according to the identified needs. However many problems may arise. For example, a same calling phone number may be used by different callers having different needs. On the contrary, a same caller may use different calling phone numbers.

A fourth method is to connect each call to a voice machine that will ask the caller to specify his needs. Once the caller needs are identified, the routing of the call to a specific agent is performed based on the identified needs.

SUMMARY OF THE INVENTION

Accordingly, it is an object of the invention to provide a method to route a communication from a caller to a specific endpoint of a contact center which does not present all the drawbacks of the known methods.

The invention provides a method to route a communication from a caller from an entry point of a contact center to a specific endpoint of the contact center wherein the routing of the communication from the entry point to the specific endpoint is done by a communication server of the contact center as a function of at least one contact center routing parameter contained in the hypertext link, this contact center routing parameter being irrelevant for routing the communication over Internet.

In the above method, there is no need to use several contact center network addresses to address the communication to the most suitable endpoint. A single contact center network address may be sufficient because the contact center routing parameter may be varied without varying the contact center network address.

There is also no need to include in the hypertext link a direct network address of a specific endpoint. In fact, the contact center routing parameter can be sufficient to determine to which specific endpoint the call should be routed. In addition, such a routing need not use the contact center network address.

Finally, it is not necessary to have a voice machine in order to identify the caller needs before routing the communication to the most suitable agent endpoint.

The embodiments of the above method to route a call may comprise one or several of the following features:
- the method comprises the concatenation of the contact center network address and the contact center routing parameter to form the contact center URL;
- the method comprises:
  incorporating at least one hypertext link in each document of a set of documents that the caller endpoint can display, the contact center network address contained in those hypertext links being the same whereas the contact center routing parameter contained in those hypertext links varies from one document to the other.

The above embodiments of the method to route a call present the following advantages:
- there is no need to add a new attribute in the hypertext link other than the <<href>> attibute to store the value of the contact center routing parameter,
- it implies no modification of the existing telecommunication protocol to transmit the contact center routing parameter.

The invention also provides a method to address a communication to a contact center over Internet, the method comprising:
  displaying a hypertext link on a caller endpoint, the hypertext link containing a contact center URL to route a communication to an entry point of the contact center over Internet, and
  upon selection of the hypertext link by a caller, addressing a communication to an entry point of the contact center over Internet using the contact center URL contained in the hypertext link,
wherein the displayed hypertext link contains a contact center routing parameter used to route the communication within the contact center to from the entry point of the contact center to a specific endpoint among a plurality of different endpoints able to receive this communication by a communication server of the contact center, this contact center routing parameter being irrelevant for routing the communication over Internet.

The embodiments of the above method to address a communication to a contact center may comprise one or several of the following features:
  addressing a communication to the contact center comprises sending the contact center routing parameter to the contact center along with a communication request over Internet;
  the communication request is an INVITE request of SIP (Session Initiation Protocol).

The invention also provides a method to receive a communication over Internet in a contact center, the method comprising, upon reception of the communication at an entry point of the contact center, routing the communication to a specific endpoint among a plurality of different endpoints of the contact center able to receive this communication by a communication server of the contact center, wherein, within the contact center, the routing of the communication from the entry point of the contact center to the specific endpoint is done as a function of at least one contact center routing parameter contained in a hypertext link selected by a caller on his endpoint, this contact center routing parameter being irrelevant for routing the communication over Internet.

The embodiments of the above method to receive a communication over Internet in a contact center may comprise one or several of the following features:
  before proceeding to the routing of the call to the specific endpoint, the method comprises:
    extracting the contact center routing parameter from a communication request,
    executing an advanced communication routing to determine to which specific endpoint the communication shall be routed as a function of the extracted contact center routing parameter;
  if no contact center routing parameter is provided, the method comprises routing the communication to a voice machine to collect through a voice interface or via database mining according to a caller identifier, the information needed to route this communication to the specific endpoint;
  the collected routing information are formatted using the same syntax as the one used for the contact center routing parameter before executing the advanced communication routing based on the formatted collected routing information so that no modification of the advanced communication routing is needed even if the routed communication was initially received without contact center routing parameter.

The invention also provides a caller endpoint comprising:
  a user interface to present at least one hypertext link, the hypertext link containing a contact center URL to route a communication to an entry point of a contact center over Internet,
  a telecommunication application to address a communication to the entry point of the contact center using the contact center URL contained in the hypertext link upon selection of the hypertext link,
wherein the hypertext link contains a contact center routing parameter used to route the communication from the entry point of the contact center to a specific endpoint among a plurality of different endpoints of the contact center able to receive this communication by a communication server of the contact center, this contact center routing parameter being irrelevant for routing the communication over Internet.

The invention also provides a communication server of a contact center, the communication server being able to route a communication received over Internet from an entry point of the contact center to a specific endpoint among different endpoints of the contact center able to receive the communication and the communication server is able to route the communication from the entry point to the specific endpoint as a function of at least one contact center routing parameter contained in a hypertext link selected by a caller on his endpoint, this contact center routing parameter being irrelevant for routing the communication over Internet.

The invention also provides a document server able to deliver over Internet a document incorporating a least one hypertext link containing a contact center URL to route a communication to an entry point of a contact center over Internet, wherein the hypertext link contains, a contact center routing parameter used to route the communication from an entry point of the contact center to a specific endpoint among a plurality of endpoints of the contact center able to receive this communication by a communication server of the contact center, this contact center routing parameter being constant or dynamically adapted to the destinator of the document, and being irrelevant for routing the communication over Internet.

These and other aspects of the invention will be apparent from the following description, drawings and claims.

BRIEF DESCRIPTION OF THE DRAWINGS

FIG. 2 is a flowchart of a method to route a communication in the telecommunication system of FIG. 1, FIG. 3 is an illustration of a conventional Click-to-Call hypertext link FIGS. 4 and 5 are illustration of two kinds of Click-to-Call hypertext link that can be used in the system of FIG. 1.

In the drawings, the same reference numbers are used to designate the same elements.

Figure 1:
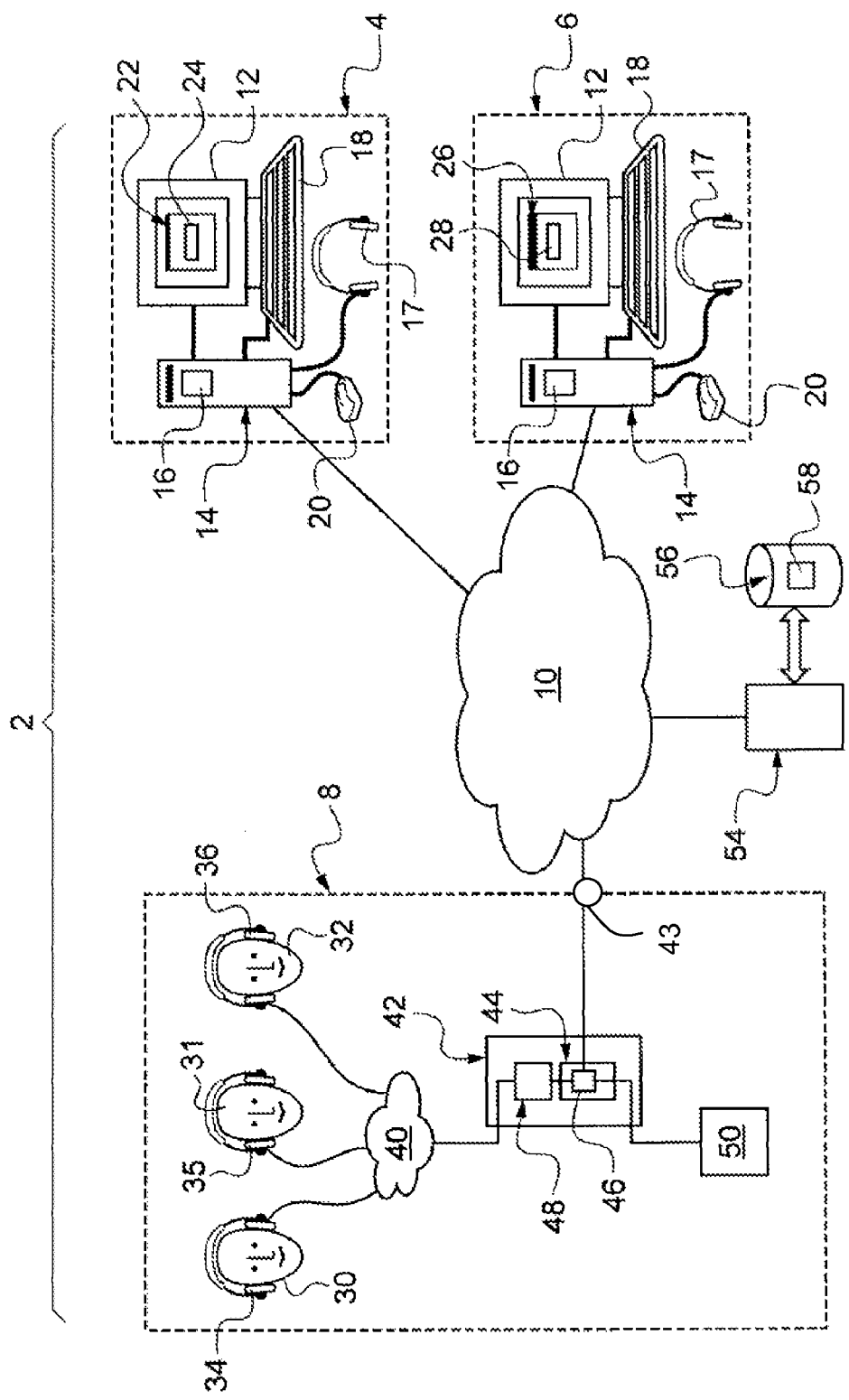
FIG. 1 is a schematic diagram of a telecommunication system including a contact center.

In the following description, well-known functions or constructions by a person of ordinary skill in the art are not described in detail.

DETAILED DESCRIPTION

The detailed description of an embodiment of the invention is done, here below, in the context of a call center. However, this is only for illustration purpose and what is described may readily be applied by a skill man to any kind of communication over Internet like email or chat.

FIG. 1 shows a telecommunication system 2 having many caller endpoints and at least one contact center. For simplicity only two caller endpoints 4 and 6 and one contact center 8 are shown.

Endpoints 4 and 6 are linked to contact center 8 through Internet 10.

Each endpoint 4 and 6 is a telecommunication terminal that includes:
 a user interface to present documents having Click-to-Call hypertext links and to select the hypertext link,
 an electronic calculator 14 able to execute a telecommunication application 16 to call over Internet, and
 a phone handset 17 to vocally communicate over Internet.

For instance, endpoints 4 and 6 are computers. Accordingly, the user interface has a screen 12, a keyboard 18 and a pointer like a mouse 20. Electronic calculator 14 is the computer central unit.

Each endpoint 4 or 6 is equipped with different multimedia applications that allow displaying on screen 12 different kind of documents having hypertext links. For example, each endpoint 4 or 6 has one or several multimedia application among the following:
 a word processing application to display text documents,
 an Internet navigator to display HTML (Hyper Text Markup Language) pages,
 an email processing application to display email containing hypertext links.

For example, endpoint 4 has an Internet navigator that display a HTML page 22 containing a Click-to-Call hypertext link 24. Page 22 is, for example, a page that offers to sell new laptops. Link 24 will be described in more details in view of FIG. 4.

Endpoint 6 has an email processing application that displays an email 26 having a Click-to-Call hypertext link 28. For example email 26 is an email from a contact center agent specialised in printer sells. Link 28 will be described in more details in view of FIG. 5.

Contact center 8 includes many contact center agents in charge to answer to calls received over Internet. Typically, contact center 8 has more than ten or hundred agents. For simplicity, only three agents 30-32 are shown. We assume that each agent 30-32 has his own specific skill to answer question. Thus depending on the question topic, the call should preferably be routed to a specific one of these agent groups. For example, agents 30, 31, 32 are specialized in printers, laptops and screens, respectively.

Each agent is equipped with an endpoint that includes a telephone to answer phone calls. Here, agents 30, 31, 32 are equipped with endpoints 34, 35, 36, respectively. For simplicity, only the telephone of each endpoint 34-36 is represented in FIG. 1.

Each endpoint is connected through a local network to a communication server 42. Communication server 42 receives every Internet phone call and routes it to the suitable endpoint. Server 42 is connected to Internet 10 through a single entry point 43. The entry point 43 can be addressed using a network address common to every telephone call received. This network address is included in a contact center URL. Here this URL is a SIP (Session Initiation Protocol) URL. Thus, whatever is the agent to be called, the caller shall use the same common contact center network address.

Communication server 42 runs a telecommunication application 44 to receive phone call over Internet. For instance, telecommunication application 44 is a SIP application.

Application 44 has a need extractor module 46 to, if possible, automatically identify the needs of the caller from a communication request. More precisely, extractor 46 is able to extract from a destination field in a communication request a contact center routing parameter. Module 46 will be described in more details in view of FIG. 2.

Communication server 42 also runs an Advanced Communication Routing (ACR) module 48. Module 48 is able to route a phone call from the entry point 43 to the specific endpoint which is the most suitable to answer the phone call as a function of the contact center routing parameter.

Communication server 42 is connected to a voice machine 50 that can retrieve information from a caller. For instance, machine 50 is able to vocally ask questions to the caller and to record his answers. Caller may answer vocally to machine 50 questions or using dual tone generated when pressing its endpoint key or by other means.

Finally, system 2 also includes at least one document server 54 connected to a memory 56 storing a set 58 of documents. Server 54 allows to download through Internet 10 any documents of set 58 on endpoints like endpoints 4 and 6. Each document of set 58 includes a Click-to-Call link to call contact center 8. Each of those links includes a common network address that correspond to contact center 8 as well as a contact center routing parameter. The value of the contact center routing parameter is different from one document of set 58 to the other. For example, server 54 is a WEB server or HTTP (Hyper Text Transfer Protocol) server.

The operation of system 2 will now be described with reference to FIGS. 2 to 5.

Initially, in step 70, the set 58 of documents is prepared. These documents are HTML pages.

First, in operation 72, a Click-to-Call hypertext link 74 (FIG. 3) is created. As illustrated in FIG. 4, link 74 is delimited by two tags "<a" and ">". These two tags enclose an SIP URL attribute 76. Attribute 76 has an attribute name "href" and an attribute value 78. Attribute value 78 contains the SIP URL of the contact center 8. The SIP URL format is the one defined in the SIP standard. Here the SIP URL to call is sip:12345678@companyname.com. This SIP URL contains the network address 12345678@companyname.com. This network address is the one of contact center 8.

In operation 74, the value of a contact center routing parameter is chosen. This parameter has a parameter name and a parameter value. Different values for the same parameter name are possible. Typically, the parameter value is chosen according to the content of the document in which it will be introduced. The parameter value may also be chosen according to information on the caller if, for example, the caller has been identified before building the contact center routing parameter.

For illustration, in link 24, the parameter name is "Skillproduct" (refer to FIG. 4). The value of this parameter is chosen according to the following table as a function of the document topic:

| Document topic | "Skillproduct" parameter value |
| --- | --- |
| Laptops | Laptops |
| Screen | Screen |
| Printer | Printer |

Subsequently, in operation 82, the contact center network address, a question mark and the contact center routing parameter are concatenated to obtain an extended SIP URL. The SIP URL in link 74 is then replaced by the extended SIP URL to obtain link 24. This results in a new Click-to-Call hypertext link shown in FIG. 4. In this example, the former SIP URL sip:12345678@companyname.com is replaced by the extended SIP URL:

sip: 12345678@companyname.com?Skillproduct=laptops.

The value "laptops" of the contact center routing parameter has been chosen because link 24 is introduced in the document which deal with laptops. The question mark is used to delimit the contact center SIP URL from the contact center routing parameter.

At the end of operation 82, link 24 is incorporated in page 22.

Operations 72, 74 and 82 are repeated to incorporate at least one Click-to-Call hypertext link in each document of set 58. These Click-to-Call links have in common the same contact center network address. However, the parameter value varies from one document to the other.

In operation 90, the documents containing link 24 and similar are saved in memory 56 and are part of set 58.

Thereafter, in step 92, the internet navigator of endpoint 4 downloads page 22 dealing with laptops and link 24 is displayed on screen 12.

Then, in step 94, the user interested in having further information on laptops discussed in page 22, selects link 24. For example, the user clicks on link 24 with the help of mouse 20.

Upon selection of link 24, in step 96, application 16 automatically triggers a call to the entry point 43 of contact center 8 over Internet 10.

More precisely, in operation 98, calculator 14 runs application 16. Once running, in operation 100, application 16 retrieves the contact center SIP URL to call from link 24.

In addition, in operation 102, application 16 prepares a communication request and copies in a destination field of the communication request the extended SIP URL included in link 24. Here, the communication request is used to warn the called party that someone wants to establish a call with him. The communication request is named "INVITE request" in SIP. The destination field of the INVITE request is the header field "to" in the INVITE request.

For further detail on the INVITE request and the header field "to", the reader may refer to the SIP standard.

Finally, in operation 104, the prepared communication request is sent to called party corresponding to the retrieve SIP URL, i.e. contact center 8.

The network address in the SIP URL is used to route the call request to the entry point 43 of contact center 8 through Internet 10. On the contrary, the contact center routing parameter is irrelevant for routing through Internet 10 and therefore is not used to route the request through Internet 10. This contact center routing parameter is simply ignored or not taken into account by Internet routing equipment.

Thereafter, in step 106, communication server 42 receives the communication request.

In step 108, extractor module 46 checks if a contact center routing parameter is present in the destination field of this request.

In the affirmative, in step 110, module 46 extracts the contact center routing parameter and transmits it to ACR module 48.

In step 122, ACR module 48 determines to which endpoint the call should be routed. This determination is based on the contact center routing parameter value extracted. In this example, the contact center routing parameter value is "laptops". Thus, module 48 determines that the call is to be routed from the entry point 43 to endpoint 35.

In step 124, module 48 routes the received call from the entry point 43 to endpoint 35. Thus, agent 31, which is the most suitable agent to answer question relating to laptops, can take the line and answer the caller question about laptops.

If in step 108, there is no contact center routing parameter in the receive communication request, then, in step 126, module 46 routes the call to voice machine 50.

In step 128, voice machine 50 takes the line and then vocally asks questions to the caller. Machine 50 also records answers to its questions. For example, questions are purposed to identify the caller needs. Once the caller need is identified, machine 50 automatically builds a contact center routing parameter using the same syntax as the one used in the click-to-call links. For example, if the identified caller need concerns laptops, machine 50 build the following contact center routing parameter:

SkillProduct=laptops.

The built contact center routing parameter is transmitted from voice machine 50 to ACR module 48. Then the method continues to step 122.

Thus, it can be noted that an ACR module able to handle call received with a contact center routing parameter can, without any modification, handle call received without contact center routing parameter.

The operation of system 2 when a user clicks on link 28 is similar to what has been described in reference to link 24. FIG. 5 shows that link 28 contains a contact center routing parameter different from the one of link 24. This contact center routing parameter is intended to route the call from the entry point 43 to the endpoint of the last contacted agent. To this end, link 28 contains a contact center routing parameter whose name is "lastContactedAgent" and whose value "ClientId". "ClientId" is an identifier used to retrieve the list of agents that have been in contact with the identified client, stored in the contact center. This list may be updated by other interaction between the client and the agents, so the hypertext link will lead to the true last contacted agent even if it is clicked long after the sending of the email that contains it.

Many other embodiments are possible. For example, several Click-to-Call hypertext links including contact center routing parameters can be incorporated in the same document.

Several contact center routing parameter can be included in the same Click-to-Call hypertext link.

Click-to-Call hypertext links can include further parameters which are not used to route the call to a specific telephone group within the contact center. For example, a further parameter indicates the URL (Uniform Resource Locator) address of the page containing the Click-to-Call link selected by the caller. This URL address may be used in the contact center to display on the agent endpoint used to answer the call the same document as the one displayed on the caller endpoint.

Voice machine 50 may be omitted.

The caller endpoint may take other form than a computer. For example, the caller endpoint is a Personnel Digital Assistant (PDA), a laptop, a mobile phone or any other kind of endpoint able to display and to select a Click-to-Call hypertext link.

System 2 may include a SIP gateway connected between Internet 10 and a PSTN (Public Switched Telephone Network). The SIP gateway convert communication transmitted through the PSTN into telephone called transmitted through Internet 10 and vice-versa. Thus a caller can address a communication to contact center 8 using an endpoint directly connected to the PSTN. This communication will not be associated with a contact center routing parameter because it is not triggered by the selection of a click-to-call link. However, as explain above, contact center 8 can handle such a communication received without contact center routing parameter.

SIP standards define non-secure SIP and secure SIP. The above teaching applies to both of them.

Furthermore, what has been described above in the specific case of phone calls can readily be applied to communications like emails and chat. In this case, communication server 42 is equipped with a telecommunication application to receive and send emails or to chat over Internet. Each agent endpoint is able to receive and send email or to chat over Internet. Contact center 8 has, for example, only one entry point 43 for email and for chat. This entry point 43 is addressed using a network address common to every email and chat. This common network address is known as an email address. On the caller terminal, a hypertext link containing an extended email address is displayed. The extended email address is the result of the concatenation of the contact center email address and the contact center routing parameter. Thereafter, the routing of email or chat within the contact center is performed in a very similar way as what has been disclosed for phone calls.

Within the contact center, the endpoint can also be any kind of machine able to automatically answer to caller. For example, the endpoint can be
- an IVR (Interactive Voice Responder) that may use text-to-speech conversion to provide the caller with the information needed,
- a call-back machine that is arranged so that the agent with the good skill call the caller latter on,
- a voice mail box to leave a vocal message to the appropriate agent,
- an answering machine that automatically delivers a message to the caller if no agent is reachable.

However, the endpoints are not HTTP servers.

The contact center routing parameter may also be included in a hypertext link by adding a special additional attribute to this hypertext link that contains this parameter. In this case, the parameter is not included in the contact center URL.

Data mining may also be used to determine the routing parameter of a communication received without this parameter from a caller identifier. For example, the caller identifier is the caller phone number. The caller identifier is used to retrieve information on the needs of this caller. Data mining may be used to replace voice machine 50.

The invention claimed is:

1. A communication server for a contact center, the communication server comprising a processor configured to route a communication received over Internet from an entry point of the contact center to a specific endpoint among different endpoints of the contact center able to receive the communication, wherein the processor is configured to route the communication from the entry point to the specific endpoint as a function of at least one contact center routing parameter contained in a hypertext link selected by a caller on an endpoint of the caller, this contact center routing parameter being irrelevant for routing the communication over Internet and wherein the processor is configured to: if no contact center muting parameter is provided in the hypertext link, route the communication to a voice machine to collect through a voice interface or via database mining according to a caller identifier, the information needed to route the communication to the specific endpoint.

2. The communication server of claim 1, wherein the processor is configured to receive the information needed to route the communication from the voice machine in a format that uses the same syntax as the format used for the contact center routing parameter.

* * * * *